US012479127B1

(12) United States Patent
Hu et al.

(10) Patent No.: US 12,479,127 B1
(45) Date of Patent: Nov. 25, 2025

(54) DEVICE FOR FORMING HIGH-STRENGTH AND HIGH-TOUGHNESS CONCRETE PRODUCT AND USING METHOD THEREOF

(71) Applicants: ZHENGZHOU UNIVERSITY, Zhengzhou (CN); NANJING HYDRAULIC RESEARCH INSTITUTE, Nanjing (CN)

(72) Inventors: Shaowei Hu, Zhengzhou (CN); Xiangqian Fan, Nanjing (CN); Shang Liu, Zhengzhou (CN); Yi Li, Zhengzhou (CN)

(73) Assignees: ZHENGZHOU UNIVERSITY, Zhengzhou (CN); NANJING HYDRAULIC RESEARCH INSTITUTE, Nanjing (CN)

( * ) Notice: Subject to any disclaimer, the term of this patent is extended or adjusted under 35 U.S.C. 154(b) by 0 days.

(21) Appl. No.: 19/262,415

(22) Filed: Jul. 8, 2025

(30) Foreign Application Priority Data

Aug. 15, 2024 (CN) ........................ 202411121619.8

(51) Int. Cl.
*B28B 5/08* (2006.01)
*B28B 5/06* (2006.01)
(Continued)

(52) U.S. Cl.
CPC .................. *B28B 5/08* (2013.01); *B28B 5/06* (2013.01); *B28B 5/10* (2013.01); *B28B 5/12* (2013.01)

(58) Field of Classification Search
CPC . B28B 2005/125; B28B 1/266; B28B 1/0935; B28B 3/025; B28B 7/0097;
(Continued)

(56) References Cited

U.S. PATENT DOCUMENTS 1,335,071 A * 3/1920 Moussette ................. B28B 5/08 425/452
1,599,151 A * 9/1926 Vought ...................... B28B 5/08 425/254
(Continued)

FOREIGN PATENT DOCUMENTS

CN 106313613 A * 1/2017 ........... B30B 15/302
CN 211362783 U 8/2020
(Continued)

OTHER PUBLICATIONS

Machine translation of CN-106313613-A (Year: 2017).*
(Continued)

*Primary Examiner* — Jeffrey M Wollschlager
*Assistant Examiner* — Edgaredmanuel Troche
(74) *Attorney, Agent, or Firm* — Cooper Legal Group, LLC

(57) ABSTRACT

A device for forming high-strength and high-toughness concrete product and a method thereof are provided. The device includes a vehicle body; a rotating disk rotatably connected to the vehicle body, a platform located above the rotating disk, and a vibration assembly. Three placement grooves are evenly spaced on a top surface of the rotating disk, and the placement grooves are used to place forming molds. The platform is fixedly connected to a storage tank, and a bottom of the storage tank is in communication with one of the forming molds in the placement grooves via a pipeline component. The platform is further provided with a thermal pressure forming component, and the platform is further provided with an ejection component. The vibration assembly includes a concrete vibrator and a lifting mechanism.

6 Claims, 9 Drawing Sheets

(51) Int. Cl.
*B28B 5/10* (2006.01)
*B28B 5/12* (2006.01)

(58) Field of Classification Search
CPC . B28B 11/08–10; B28C 43/08; B28C 43/085; B28C 2043/3266; B28C 2043/3494; B29K 2909/06; B30B 11/022; E01G 21/066; E01C 19/40
USPC ............... 425/406, 407, 409, 425, 433, 435, 425/DIG. 132, 62, 219, 212, 361, 126.2, 425/DIG. 5, DIG. 126, 421, 456, 350, 425/155, 112, 120, 122, 126.1, 305.1, 425/388, 437, 448, 89; 52/122.1–126.7; 414/222.13, 525.7, 525.8
See application file for complete search history.

(56) References Cited

U.S. PATENT DOCUMENTS

| | | | | | |
|---|---|---|---|---|---|
| 1,792,844 | A * | 2/1931 | Knecht | B28B 3/10 | 425/134 |
| 2,224,653 | A * | 12/1940 | Lane | B28B 5/06 | 425/263 |
| 2,560,208 | A * | 7/1951 | Benischek | B28B 5/08 | 425/254 |
| 2,651,809 | A * | 9/1953 | Berthold | B29C 43/08 | 425/340 |
| 3,245,130 | A * | 4/1966 | Dowley | B28B 5/08 | 414/769 |
| 4,557,681 | A * | 12/1985 | Wright | B28B 5/08 | 425/62 |
| 4,725,216 | A * | 2/1988 | Foster | B28B 5/08 | 366/65 |
| 4,944,907 | A * | 7/1990 | Davis, Jr. | B28B 13/06 | 264/220 |
| 5,082,681 | A * | 1/1992 | Barlow | A01J 25/12 | 425/85 |
| 2009/0273114 | A1* | 11/2009 | Moshel | B30B 11/10 | 425/219 |
| 2014/0120202 | A1* | 5/2014 | Manni | B28B 15/002 | 425/432 |

FOREIGN PATENT DOCUMENTS

| | | | | | |
|---|---|---|---|---|---|
| CN | 112476712 | A | | 3/2021 | |
| CN | 112536892 | A | * | 3/2021 | B28B 3/04 |
| CN | 113043431 | A | * | 6/2021 | B28B 13/026 |
| CN | 113882218 | A | | 1/2022 | |
| CN | 114232420 | A | | 3/2022 | |
| CN | 116587434 | A | | 8/2023 | |
| CN | 117260935 | A | * | 12/2023 | B28B 5/08 |
| CN | 220280001 | U | | 1/2024 | |
| CN | 117817826 | A | * | 4/2024 | B28C 7/16 |
| GB | 205679 | A | * | 10/1923 | B28B 5/08 |
| GB | 392357 | A | * | 5/1933 | B28B 1/045 |
| KR | 20030068868 | A | * | 8/2003 | B28B 5/08 |
| KR | 20120107690 | A | * | 10/2012 | B28B 15/00 |
| WO | WO-9616784 | A1 | * | 6/1996 | B29C 41/22 |
| WO | 2022127031 | A1 | | 6/2022 | |

OTHER PUBLICATIONS

Machine translation of CN-112536892-A (Year: 2021).*
Machine translation of CN-113043431-A (Year: 2021).*
Machine translation of CN-117260935-A (Year: 2023).*
Machine translation of KR-20120107690-A (Year: 2012).*
Machine translation of WO-9616784-A1 (Year: 1996).*
Notice of first Office action dated Jan. 15, 2025 in SIPO application No. CN202411121619.8, 12 pages.
Retrieval report—First search dated Jan. 15, 2025 in SIPO application No. CN202411121619.8, 5 pages.
Notification to Grant Patent Right for Invention dated Apr. 25, 2025 in SIPO application No. CN202411121619.8, 3 pages.
Retrieval report—Supplementary search dated Apr. 18, 2025 in SIPO application No. CN202411121619.8, 4 pages.

* cited by examiner

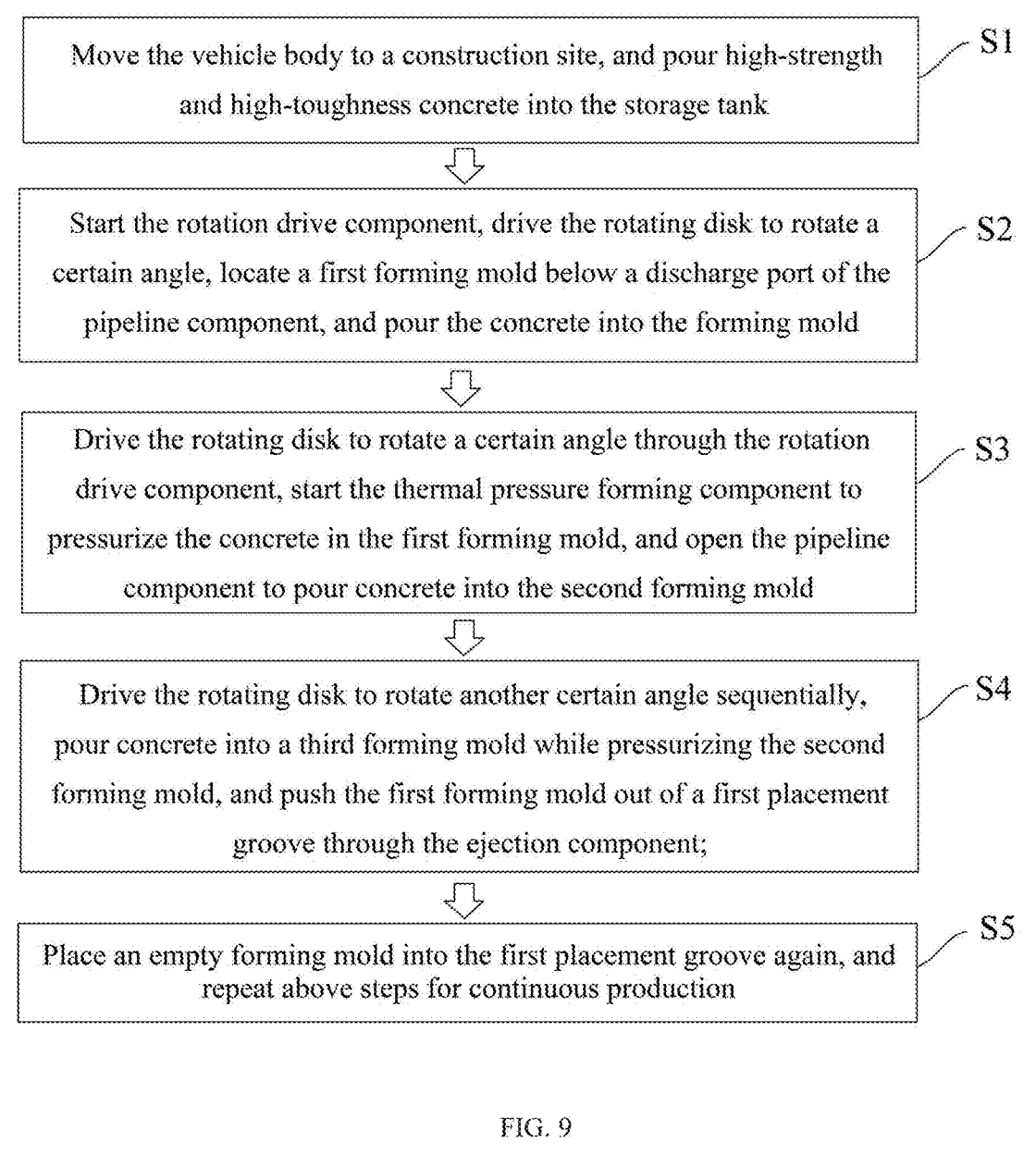

S1: Move the vehicle body to a construction site, and pour high-strength and high-toughness concrete into the storage tank

⇩

S2: Start the rotation drive component, drive the rotating disk to rotate a certain angle, locate a first forming mold below a discharge port of the pipeline component, and pour the concrete into the forming mold

⇩

S3: Drive the rotating disk to rotate a certain angle through the rotation drive component, start the thermal pressure forming component to pressurize the concrete in the first forming mold, and open the pipeline component to pour concrete into the second forming mold

⇩

S4: Drive the rotating disk to rotate another certain angle sequentially, pour concrete into a third forming mold while pressurizing the second forming mold, and push the first forming mold out of a first placement groove through the ejection component;

⇩

S5: Place an empty forming mold into the first placement groove again, and repeat above steps for continuous production

FIG. 9

DEVICE FOR FORMING HIGH-STRENGTH AND HIGH-TOUGHNESS CONCRETE PRODUCT AND USING METHOD THEREOF

CROSS-REFERENCE TO RELATED APPLICATIONS

This application claims priority to Chinese Patent Application No. 202411121619.8, filed on Aug. 15, 2024, the contents of which are hereby incorporated by reference.

TECHNICAL FIELD

The present disclosure belongs to the technical field of concrete prefabrication, and particularly relates to a device for forming high-strength and high-toughness concrete product and a using method thereof.

BACKGROUND

Traditional concrete has the following limitations. Due to the limited strength grade and durability, traditional concrete is difficult to meet the engineering needs under some ultra-high loads or harsh environmental conditions. Due to the low tensile strength, traditional concrete is unsuitable for structures subjected to tensile forces. Due to the lack of toughness, traditional concrete is prone to crack under the influence of environmental factors such as temperature and humidity, which not only affects its aesthetics, but also induces the decrease of structural strength and durability. Meanwhile, with the acceleration of urbanization and the expansion of engineering scales, the performance requirements for concrete materials are becoming increasingly high. As a result, traditional concrete may no longer meet the demands of modern engineering. To address the issues of traditional concrete, researchers have continuously sought improvements and innovations, developing new concrete materials such as high-strength and high-toughness concrete to enhance mechanical performance and durability while mitigating its drawbacks. The research and application of high-strength and high-toughness concrete play a crucial supporting role in advancing technological progress in industries such as water conservancy and construction, as well as in improving the overall quality and standards of engineering projects.

Although high-strength and high-toughness concrete exhibits excellent mechanical performance and durability, and demonstrates outstanding capabilities in key projects such as large-scale water conservancy projects, high-rise buildings, long-span bridges, highways, and tunnels, thereby providing strong guarantees for the stability and safety of these projects, related studies have found that achieving high strength and toughness in concrete requires reducing internal voids or increasing forming temperature. For example, external or internal energy, such as vacuum mixing, as well as pressure applied before and during the solidification process, may reduce the internal voids in concrete. For example, increasing the mixing pressure during forming may lower the air content in concrete, reduce voids in concrete, and enhance the strength of concrete. Additionally, compared to curing at room temperature, as the forming temperature increases, both the compressive and flexural strength of high-strength and high-toughness concrete gradually improve.

To effectively address the aforementioned issues, there is an urgent need to provide a device for forming high-strength and high-toughness concrete product to improve the strength and production efficiency of high-strength and high-toughness concrete related products.

SUMMARY

An objective of the present disclosure is to provide a device for forming high-strength and high-toughness concrete product and a using method thereof, aiming to solve the problems, enhance the strength and toughness of high-strength and high-toughness concrete products, and enable continuous production to improve the production efficiency of high-strength and high-toughness concrete related products.

To achieve the above objective, the present disclosure provides the following solution: a device for forming high-strength and high-toughness concrete product, including:

- a vehicle body;
- a rotating disk, where the rotating disk is rotatably connected to the vehicle body, three placement grooves are evenly spaced along an edge of a top surface of the rotating disk, the placement grooves are used to place forming molds, and a rotation drive component is provided between the rotating disk and the vehicle body;
- a platform, where the platform is fixedly connected to the vehicle body, the platform is located above the rotating disk, the platform is fixedly connected to a storage tank, and a bottom of the storage tank is in communication with one of the forming molds in the placement grooves via a pipeline component; the platform is further provided with a thermal pressure forming component, and the thermal pressure forming component is used to heat and pressurize concrete in another of the forming molds; and the platform is further provided with an ejection component, and the ejection component is used to push the forming molds after a pressurization process of the thermal pressure forming component out of the placement grooves; and
- a vibration assembly, where the vibration assembly includes a concrete vibrator and a lifting mechanism arranged between the platform and the rotating disk, and the lifting mechanism is used to raise or lower the concrete vibrator.

In some embodiments, the concrete vibrator and the pipeline component are arranged in correspondence with the same one of the forming molds, the lifting mechanism is used to vibrate the concrete when the concrete is poured into the forming mold, and to pull out the concrete vibrator from the forming mold when the rotating disk drives the forming mold to rotate.

In some embodiments, the lifting mechanism includes a hinge base fixedly connected to a top of the platform, a middle part of a link is hinged on the hinge base, one end of the link is hinged to one end of a connecting rod, and the other end of the connecting rod penetrates the platform and is fixedly connected to the concrete vibrator; the rotating disk is coaxially and fixedly connected to a rotating rod, one end of the rotating rod away from the rotating disk penetrates the platform and is coaxially and fixedly connected to a pressing-down component, and the pressing-down component is used to lift the other end of the link away from the connecting rod when the concrete is poured into the forming mold, so as to enable the concrete vibrator to extend into the forming mold, and to press down the other end of the link away from the connecting rod during rotation of the rotating disk, so as to pull out the concrete vibrator from the forming mold.

In some embodiments, the pressing-down component includes a pressing disk coaxially and fixedly connected to the end of the rotating rod away from the rotating disk, an edge of the pressing disk is provided with three intermediate grooves evenly spaced inward, a bottom of the pressing disk is evenly and fixedly connected to three pressing-down blocks, the three intermediate grooves and the three pressing-down blocks are alternately arranged, the pressing-down blocks are used to press down the other end of the link away from the connecting rod, and the intermediate grooves are used to lift the other end of the link away from the connecting rod.

In some embodiments, the ejection component includes a fixed plate fixedly connected to a bottom of the platform, a cylinder is horizontally fixedly connected to the fixed plate, a push block is fixedly connected to a telescopic end of the cylinder, and the push block is used to push out the forming mold containing the pressurized concrete; and locking components are provided between the rotating disk and the placement grooves, the locking components are used to prevent the forming molds from shifting in the placement grooves and to automatically unlock the forming molds when the push block pushes out the forming molds.

In some embodiments, each locking component includes a sliding groove formed in the rotating disk, an intermediate rod is connected to and configured to vertically slide in the sliding groove, a spring is abutted between the intermediate rod and a bottom of the sliding groove, two ends of the intermediate rod are respectively and fixedly connected to a pressing block and a stopper, one end of the pressing block away from the intermediate rod penetrates a top of the rotating disk and is arranged in correspondence with the push block, and one end of the stopper away from the intermediate rod penetrates a bottom of a corresponding one the placement grooves and is arranged in correspondence with a side wall of a corresponding one of the forming molds entering an edge of the rotating disk.

In some embodiments, the rotation drive component includes a gear ring fixedly sleeved on the rotating disk and a motor fixedly connected to the vehicle body, and an output shaft of the motor is fixedly sleeved with a gear, and the gear meshes with the gear ring.

In some embodiments, the thermal pressure forming component includes a hydraulic cylinder vertically and fixedly connected to a bottom of the platform, a pressing plate is fixedly connected to a telescopic end of the hydraulic cylinder, the pressing plate is used to press down the concrete in the forming molds containing the concrete, and an electric heating wire is provided in the pressing plate.

The present disclosure further provides a using method of the device for forming high-strength and high-toughness concrete product, the operation steps including:

- moving the vehicle body to a construction site, and pouring the concrete into the storage tank;
- starting the rotation drive component, driving the rotating disk to rotate by an angle through the rotation drive component, locating the first forming mold below a discharge port of the pipeline component, and pouring the concrete into the first forming mold through the pipeline component;
- driving the rotating disk to rotate by another angle by the rotation drive component, locating the second forming mold below the discharge port of the pipeline component, locating the first forming mold below the thermal pressure forming component; starting the thermal pressure forming component to pressurize the concrete in the first forming mold, and opening the pipeline component to pour the concrete into the second forming mold;
- driving the rotating disk to rotate by yet another angle sequentially through the rotation drive component, pouring the concrete into a third forming mold while pressurizing the second forming mold, and pushing the first forming mold out of a first placement groove through the ejection component; and
- placing an empty forming mold is into the first placement groove again, and repeating the above steps for continuous production.

Compared to the relevant art, the present disclosure offers the following advantages and technical effects.

The present disclosure achieves continuous production of high-strength and high-toughness concrete products by rotating the forming molds sequentially to the next process via the rotating disk. By automatically removing the finished product from the rotating disk through the ejection component, the production efficiency of high-strength and high-toughness concrete related products may be effectively improved.

The thermal pressure forming component applies downward pressure to the concrete in the forming mold, accelerating the formation of the concrete and further improving production efficiency.

The vibration assembly not only vibrates the concrete when the concrete is poured into the forming mold, but also automatically shifts the concrete vibrator when the rotating disk rotates, avoiding motion interference with the forming mold during the rotation of the rotating disk and ensuring stable operation of continuous production.

BRIEF DESCRIPTION OF THE DRAWINGS

In order to explain the embodiments of the present disclosure or the technical solution in the prior art more clearly, the drawings needed in the embodiments will be briefly introduced below. Apparently, the drawings in the following description are only some embodiments of the present disclosure. For one of ordinary skill in the art, other drawings may be obtained according to these drawings without creative effort.

FIG. 9 is a flowchart of a using method of the device according to the present disclosure.

DETAILED DESCRIPTION OF THE EMBODIMENTS

Figure 1:
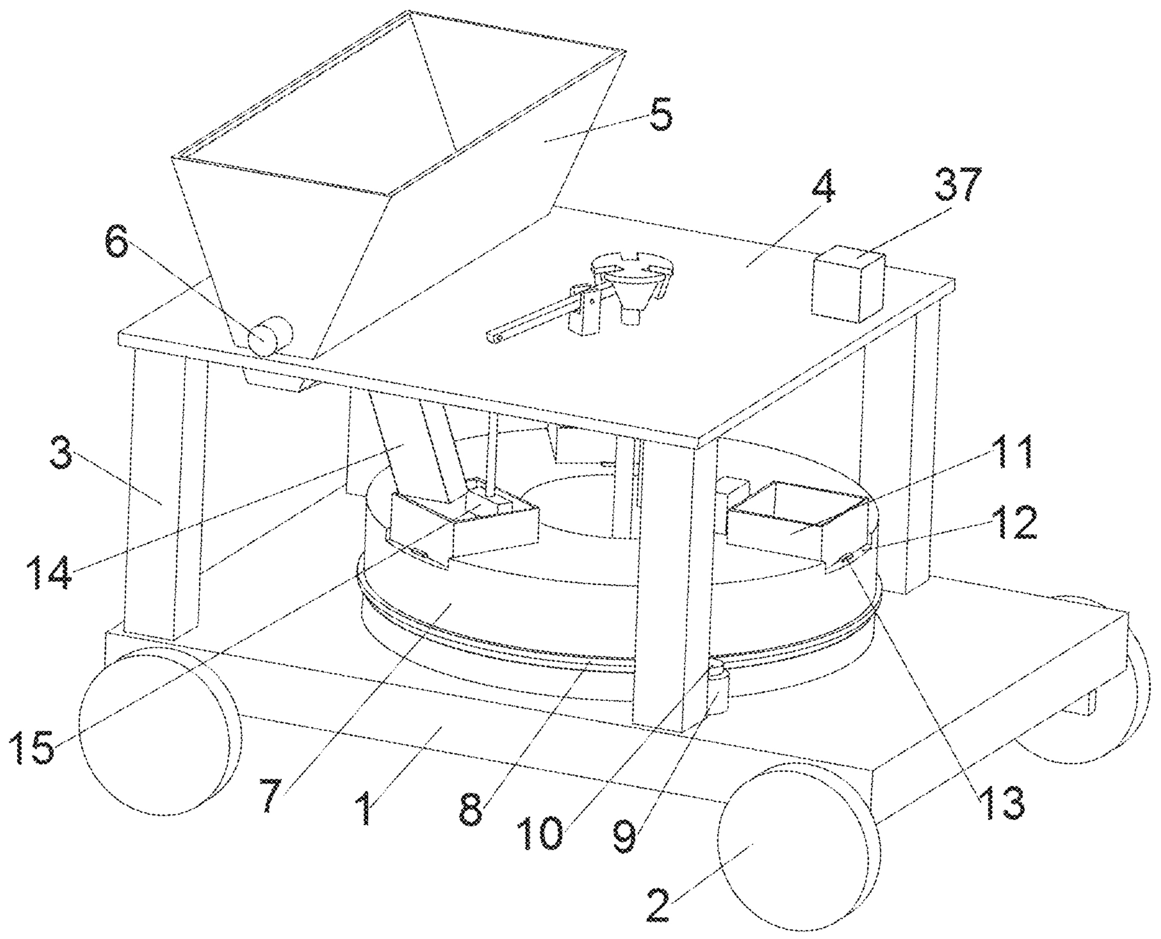
FIG. 1 is a schematic diagram of a forming device according to the present disclosure.

In the following, the technical solutions in the embodiments of the present disclosure will be clearly and completely described with reference to the attached drawings. Apparently, the described embodiments are only a part of the embodiments of the present disclosure, but not all the embodiments. Based on the embodiments in the present disclosure, all other embodiments obtained by one of ordinary skill in the art without creative effort belong to the protection scope of the present disclosure.

In order to make the above objects, features and advantages of the present disclosure more obvious and easier to understand, the present disclosure will be further described in detail with the attached drawings and specific embodiments.

Embodiment 1

With reference to FIG. 1 to FIG. 8, the present disclosure provides a device for forming high-strength and high-toughness concrete product, including: a vehicle body 1, a rotating disk 7, a platform 4, and a vibration assembly.

The rotating disk 7 is rotatably connected to the vehicle body 1, and three placement grooves 12 are evenly spaced along the edge of the top surface of the rotating disk 7, the placement grooves 12 are used to place forming molds 11, and a rotation drive component is provided between the rotating disk 7 and the vehicle body 1.

The platform 4 is fixedly connected to the vehicle body 1, the platform 4 is located above the rotating disk 7, the platform 4 is fixedly connected to a storage tank 5, and the bottom of the storage tank 5 is in communication with the forming mold 11 in the respective placement groove 12 via a pipeline component. The platform 4 is further provided with a thermal pressure forming component, and the thermal pressure forming component is used to pressurize the concrete in the other forming mold 11. The platform 4 is further provided with an ejection component, and the ejection component is used to push the forming mold 11 that has undergone the pressurization process by the thermal pressure forming component out of the respective placement groove 12.

The vibration assembly includes a concrete vibrator 15 and a lifting mechanism arranged between the platform 4 and the rotating disk 7, and the lifting mechanism is used to raise and lower the concrete vibrator 15.

The main function of the rotating disk 7 is to rotate the three placement grooves 12 sequentially to the next process, enabling the continuous production. The main function of the rotation drive component is to drive the rotating disk 7 to rotate. The main function of the pipeline component is to pour an appropriate amount of concrete from the storage tank 5 into the forming mold 11. The main function of the thermal pressure forming component is to apply downward pressure to the concrete in the forming mold 11, accelerating the formation of the concrete. The main function of the ejection component is to push the compressed and preformed concrete and the forming mold 11 out of the placement groove 12, facilitating the placement of a new forming mold 11 into the placement groove 12. Overall, the present disclosure enables hot-pressing and preforming of concrete and continuous production of high-strength and high-toughness concrete products, improving production efficiency of high-strength and high-toughness concrete related products.

In an embodiment, a controller 37 is further provided, and the controller is electrically connected to the rotation drive component, the pipeline component, the thermal pressure forming component, and the ejection component.

In an embodiment, the pipeline component includes a discharge pipe 14, which is provided with an electromagnetic valve 38. One end of the discharge pipe 14 is in communication with the bottom of the storage tank 5, and the other end of the discharge pipe 14 is in communication with the interior of one of the forming molds 11. A vibrator 20 is installed on the discharge pipe 14 and electrically connected to the controller 37.

Figure 4:
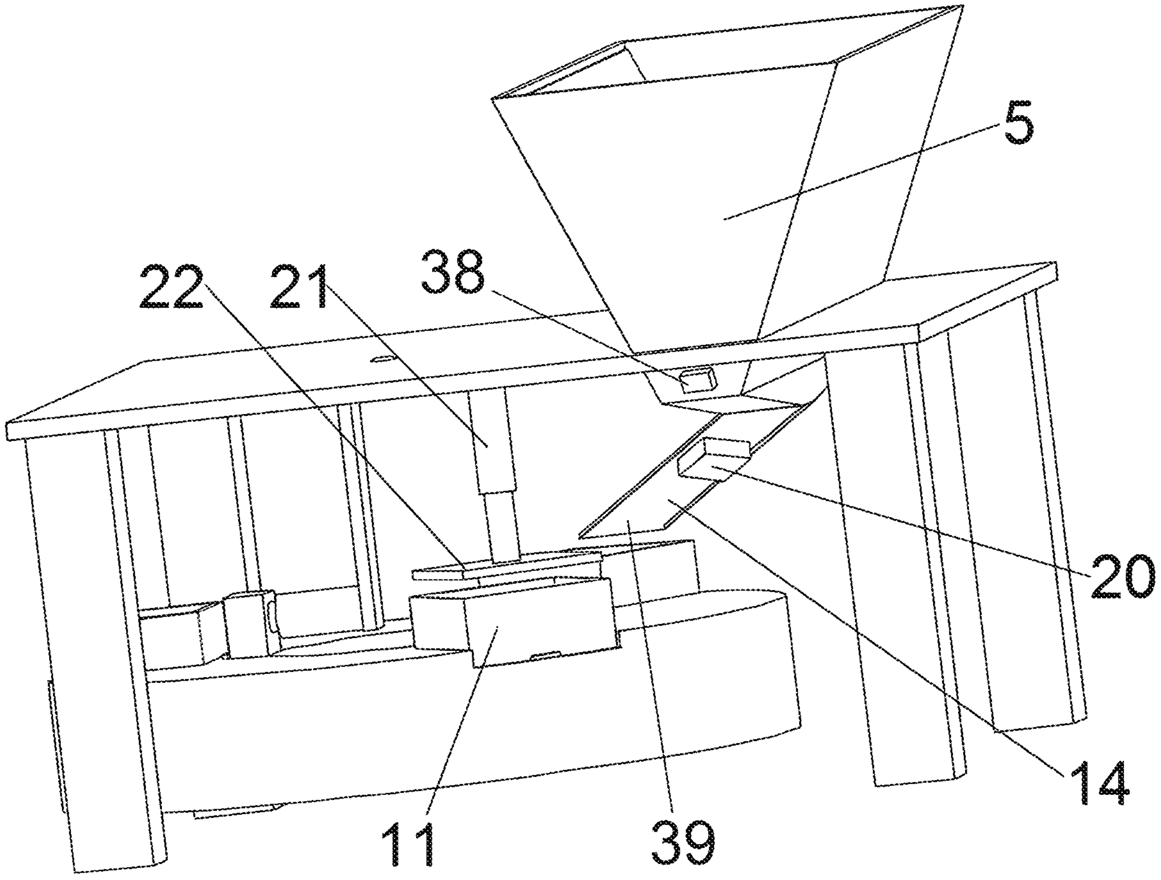
FIG. 4 is a schematic diagram of a thermal pressure forming component according to the present disclosure.

As shown in FIG. 4, during the flow of concrete in the discharge pipe 14, the vibrator 20 may accelerate the flow velocity of concrete by vibrating the discharge pipe 14.

In an embodiment, the platform 4 is fixedly connected to the vehicle body 1 via several columns 3.

In an embodiment, the concrete vibrator 15 and the pipeline component are arranged in correspondence with the same forming mold 11, the lifting mechanism is used to vibrate the concrete when the concrete is poured into the forming mold 11 and to pull out the concrete vibrator 15 from the forming mold 11 when the rotating disk 7 drives the forming mold 11 to rotate.

As shown in FIG. 1, the concrete vibrator 15 is a conventional device in the relevant art, so it's working principle and process are not reiterated. When pouring the concrete into the forming mold 11, the concrete is vibrated by the concrete vibrator 15, thereby improving the compactness of the concrete in the forming mold 11 and ensure thing quality of the concrete product.

In an embodiment, the lifting mechanism includes a hinge base 25 fixedly connected to the top of the platform 4. A middle part of a link 24 is hinged on the hinge base 25, one end of the link 24 is hinged to one end of a connecting rod 23, and the other end of the connecting rod 23 penetrates the platform 4 and is fixedly connected to the concrete vibrator 15. The rotating disk 7 is coaxially and fixedly connected to a rotating rod 28, one end of the rotating rod 28 away from the rotating disk 7 penetrates the platform 4 and is coaxially and fixedly connected to a pressing-down component, and the pressing-down component is used to lift the other end of the link 24 away from the connecting rod 23 when the concrete is poured into the forming mold 11, enabling the concrete vibrator 15 to extend into the forming mold 11, and to press down the other end of the link 24 away from the connecting rod 23 during rotation of the rotating disk 7, thereby pulling out the concrete vibrator 15 from the forming mold 11.

In an embodiment, the pressing-down component includes a pressing disk 26 coaxially and fixedly connected to the end of the rotating rod 28 away from the rotating disk 7, the edge of the pressing disk 26 is provided with three intermediate grooves 33 evenly spaced inward, the bottom of the pressing disk 26 is evenly and fixedly connected to three pressing-down blocks 27, the three intermediate grooves 33 and the three pressing-down blocks 27 are alternately arranged, the pressing-down blocks 27 are used to press down the other end, away from the connecting rod 23, of the link 24, and the intermediate grooves 33 are used for the lifting of the other end, away from the connecting rod 23, of the link 24.

Figure 3:
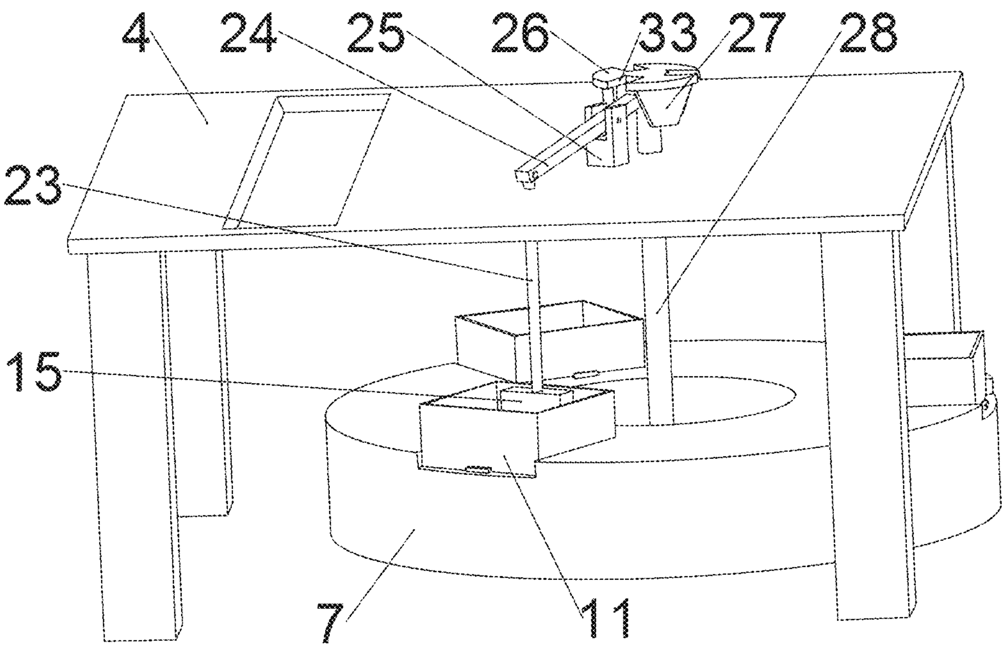
FIG. 3 is a schematic diagram of a vibration assembly according to the present disclosure.

As shown in FIG. 1 and FIG. 3, the inner diameter of the through hole opened on platform 4 for the connecting rod 23 to pass through is larger than the outer diameter of connecting rod 23 to ensure that there will be no interference during the movement of the connecting rod 23. The three intermediate grooves 33 are in one-to-one correspondence with the three placement grooves 12, and the three intermediate grooves 33 and the three placement grooves 12 are respectively on the same straight line. When one of the forming molds 11 is located below the discharge port 39 of the pipeline component, the other end of the link 24 away from the connecting rod 23 is exactly in one of the intermediate grooves 33 on the pressing disk 26. At this time, the intermediate groove 33 cannot apply pressure to the link 24. The concrete vibrator 15 pulls down the connecting rod 23 by gravity, and the hinged end of the link 24 abuts against the top of the platform 4. The concrete vibrator 15 extends into the forming mold 11, and the free end of the link 24 is in the intermediate groove 33. When the forming mold 11 is filled with concrete, the rotation drive component drives the rotating disk 7 to rotate. When the rotating disk 7 rotates, the pressing disk 26 will rotate synchronously. At this time, one of the pressing-down blocks 27 contacts the free end of the link 24. By pressing down the link 24 through the wedge-shaped surface of the pressing-down block 27, the link 24 rotates around the hinge base 25 to lift up the connecting rod 23, thereby pulling the concrete vibrator 15 out of the forming mold 11, avoiding motion interference between the concrete vibrator 15 and the forming mold 11.

In an embodiment, the ejection component includes a fixed plate 16 fixedly connected to the bottom of the platform 4, a cylinder 17 is horizontally fixedly connected to the fixed plate 16, and a push block 18 is fixedly connected to a telescopic end of the cylinder 17, and the push block 18 is used to push out the forming mold 11 containing the pressurized concrete. A locking component is provided between the rotating disk 7 and the placement grooves 12, the locking component is used to prevent the forming mold 11 from shifting in the placement groove 12 and to automatically unlock the forming mold 11 when the push block 18 pushes out the forming mold 11.

Figure 2:
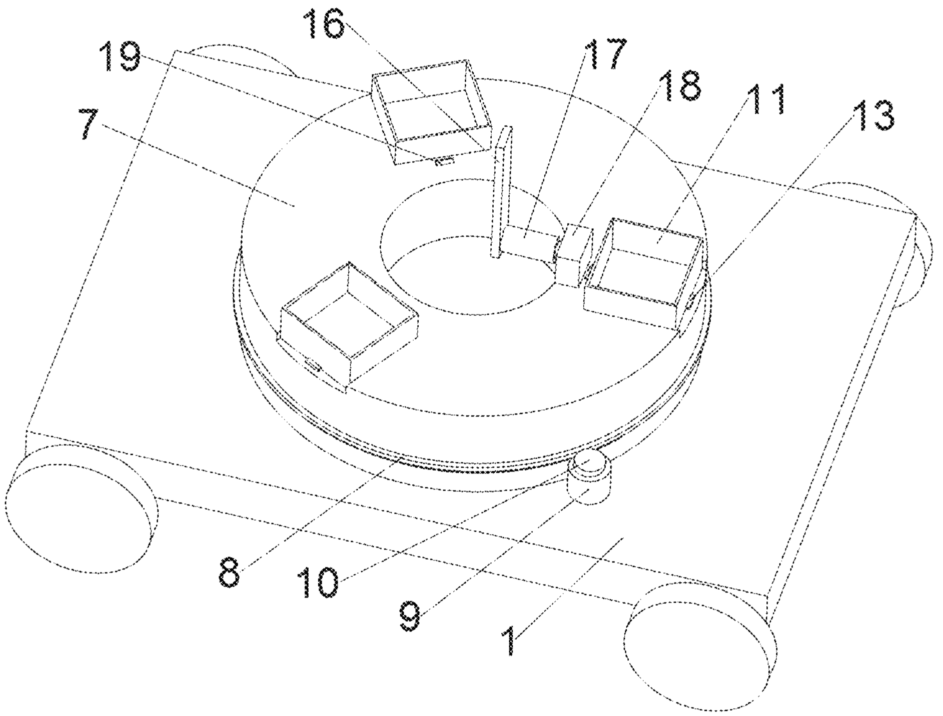
FIG. 2 is a schematic diagram of a rotating disk according to the present disclosure.

As shown in FIG. 2, when there is a need to push the forming mold 11 facing the push block 18 out of the placement groove 12, the controller may control the cylinder 17 to extend, driving the push block 18 to push the forming mold 11 to the edge of the rotating disk 7, thereby pushing the forming mold 11 out of the placement groove 12.

In an embodiment, each locking component includes a sliding groove 31 formed in the rotating disk 7, an intermediate rod 30 is arranged in the sliding groove 31 and configured to vertically slide in the sliding groove 31, a spring 29 is abutted between the intermediate rod 30 and the bottom of the sliding groove 31. Two ends of the intermediate rod 30 are fixedly connected to a pressing block 19 and a stopper 13, respectively. One end of the pressing block 19 away from the intermediate rod 30 penetrates the top of the rotating disk 7 and is arranged in correspondence with the push block 18, one end of the stopper 13 away from the intermediate rod 30 penetrates the bottom of the placement groove 12 and is arranged in correspondence with the side wall of the forming mold 11 entering the edge of the rotating disk 7.

Figure 7:
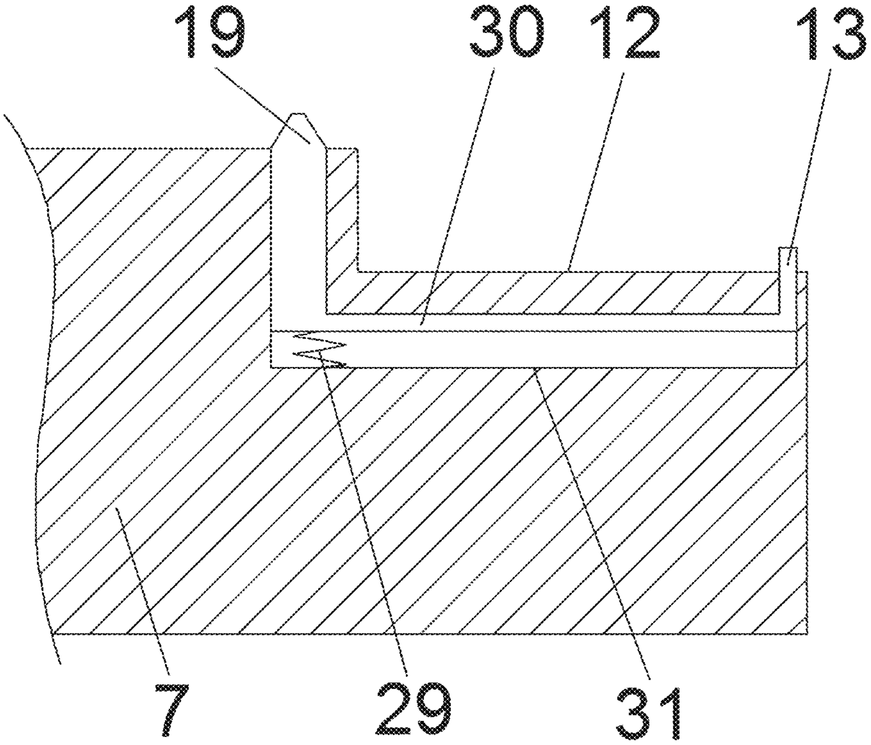
FIG. 7 is a schematic diagram of a locking component according to the present disclosure.

As shown in FIG. 2 and FIG. 7, when the forming mold 11 does not need to be pushed out, the spring 29 pushes up the intermediate rod 30, which may drive the stopper 13 to extend out of the placement groove 12. When the forming mold 11 is resisted in the placement groove 12, the forming mold 11 is prevented from sliding out of the placement groove 12 during the rotation of the rotating disk 7. When the forming mold 11 needs to be ejected, with the movement of the push block 18, the push block 18 first contacts with the pressing block 19, and presses the pressing block 19 down through the wedge-shaped surface on the pressing block 19. The pressing block 19 is pressed down to drive the stopper 13 to retract inside the placement groove 12 through the intermediate rod 30, thus ensuring that the forming mold 11 may smoothly slide out of the placement groove 12.

In an embodiment, the rotation drive component includes a gear ring 8 fixedly sleeved on the rotating disk 7 and a second motor 9 fixedly connected to the vehicle body 1, and the output shaft of the second motor 9 is fixedly sleeved with a gear 10, and the gear 10 meshes with the gear ring 8.

As shown in FIG. 2, the second motor 9 is controlled by the controller to rotate a certain angle each time, and the second motor 9 drives the gear 10 to rotate synchronously. Through the meshing of the gear 10 and the gear ring 8, the gear ring 8 may drive the rotating disk 7 to rotate 120 degrees each time, so that the three forming molds 11 may correspond to the discharge pipe 14, the thermal pressure forming component, and the push block 18 in sequence.

In an embodiment, the thermal pressure forming component includes a hydraulic cylinder 21 vertically and fixedly connected to the bottom of the platform 4, a pressing plate 22 is fixedly connected to the telescopic end of the hydraulic cylinder 21, the pressing plate 22 is used to press down the concrete in the forming mold 11 containing the concrete, and an electric heating wire 36 is provided in the pressing plate 22.

Figure 8:
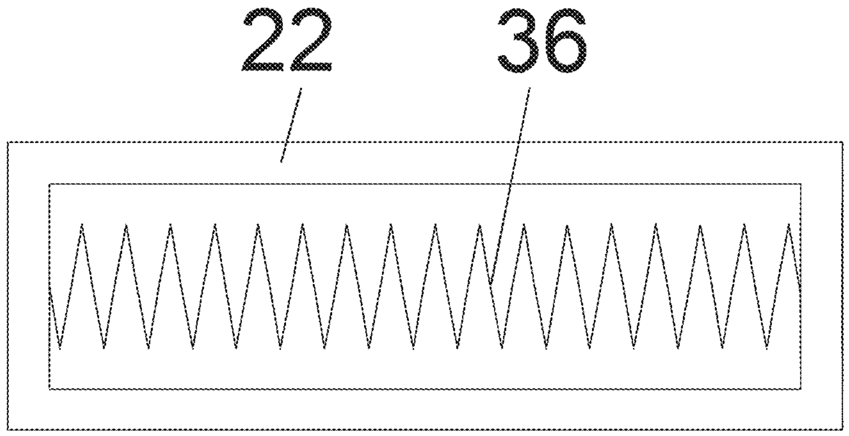
FIG. 8 is a sectional view of a pressing plate according to the present disclosure.

As shown in FIG. 4 and FIG. 8, the main function of the electric heating wire 36 is to heat the pressing plate 22. The controller controls the telescopic end of the hydraulic cylinder 21 to extend out, driving the pressing plate 22 to hot-press the concrete in the forming mold 11. After a certain period of hot-pressing, the pre-forming of the concrete is achieved.

In an embodiment, the, a mixing shaft 34 is horizontally and rotatably connected to the storage tank 5, and several mixing rods 35 are fixedly connected to the mixing shaft 34. One end of the mixing shaft 34 is drivingly connected to a first motor 6, and the first motor 6 is fixedly connected to the side wall of the storage tank 5 and is electrically connected to the controller.

The controller controls the first motor 6 to rotate, and the rotation of the first motor 6 drives the mixing shaft 34 to rotate, so that several mixing rods 35 may mix concrete in the production process.

In an embodiment, the bottom of the vehicle body 1 is rotatably connected to several wheels 2.

A using method of the device for forming high-strength and high-toughness concrete product is provided, as shown in FIG. 9. The operation steps are as follows.

S1, the vehicle body 1 is moved to the construction site, and the high-strength and high-toughness concrete is poured into the storage tank 5.

S2, the rotation drive component is started, and the rotation drive component drives the rotating disk 7 to rotate a certain angle, so that the first forming mold 11 is located below the discharge port of the pipeline component, and concrete is poured into the forming mold 11 through the pipeline component.

Before production, firstly, the three forming molds 11 are respectively put into the three placement grooves 12. At the same time, the electric heating wire 36 is energized to preheat the pressing plate 22. The first forming mold 11 is located below the discharge pipe 14 by the second motor 9, the electromagnetic valve 38 in the discharge pipe 14 is opened to allow an appropriate amount of concrete to flow into the first forming mold 11, and meanwhile the concrete vibrator 15 is started to vibrate the concrete.

S3, the rotating disk 7 is driven by the rotation drive component to rotate a certain angle, so the second forming mold 11 is located below the discharge port of the pipeline component, meanwhile, the first forming mold 11 is located below the thermal pressure forming component. The thermal pressure forming component is started to pressurize the concrete in the first forming mold 11, and meanwhile the pipeline component is opened to pour concrete into the second forming mold 11.

The second motor 9 is controlled to rotate the rotating disk 7 by 120 degrees. During the rotation process, the pressing-down block 27 pushes down the link 24 to pull the concrete vibrator 15 out of the first forming mold 11. After the rotation is completed, the first forming mold 11 is located below the pressing plate 22, the second forming mold 11 is located below the discharge pipe 14, and the link 24 is located in the intermediate groove 33, and the concrete vibrator 15 extends into the second forming mold 11. The pressing plate 22 is pressed down by the hydraulic cylinder 21 to perform hot-pressing and preforming on the concrete in the first forming mold 11, and at the same time, the electromagnetic valve is opened, and an appropriate amount of concrete is poured into the second forming mold 11.

S4, the rotation drive component continues to drive the rotating disk 7 to rotate a certain angle, the concrete is poured into the third forming mold 11, and at the same time, the second forming mold 11 is pressurized, and the first forming mold 11 is pushed out of the first placement groove 12 through the ejection component.

The second motor 9 is controlled to continue rotating the rotating disk 7 by 120 degrees. After the rotation is completed, the first forming mold 11 corresponds to the push block 18, the second forming mold 11 is located below the pressing plate 22, and the third forming mold 11 is located below the discharge pipe 14. The concrete in the second forming mold 11 is hot-pressed. Concrete is poured into the third forming mold 11. At the same time, the cylinder 17 is controlled to extend and push out the first forming mold 11 from the first placement groove through the push block 18.

S5, an empty forming mold 11 is put into the first placement groove 12 again, and the above steps are repeated for continuous production.

The worker puts the new forming mold 11 in the vacant placement groove 12. With the continuous rotation of the rotating disk 7, continuous production is realized.

Embodiment 2

The only difference between this embodiment and the Embodiment 1 is that several wheels 2 are connected to traveling motors 32 in a transmission manner, and the traveling motors 32 are fixedly connected to the vehicle body 1.

Figure 5:
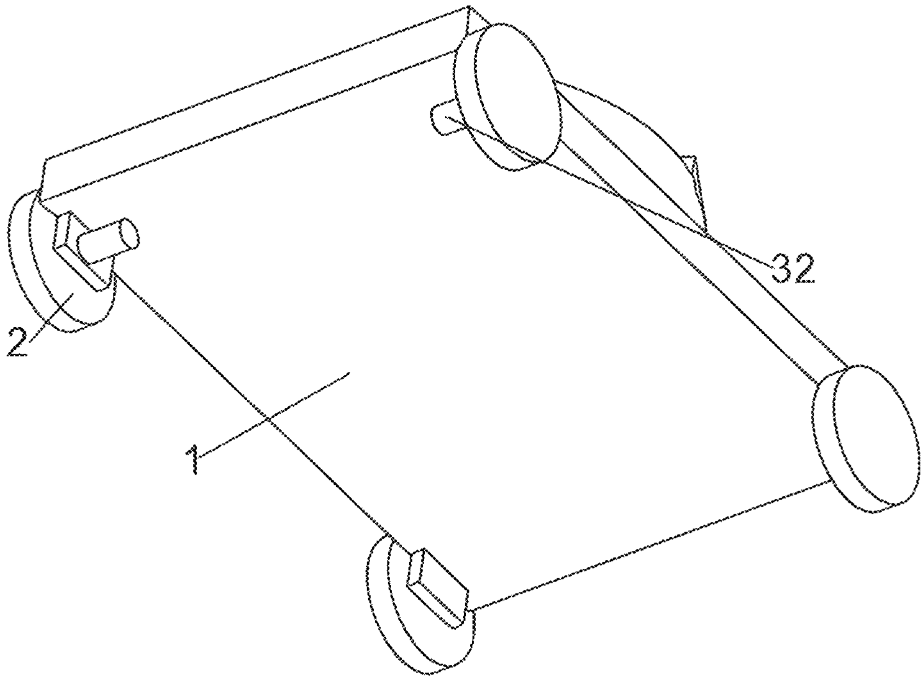
FIG. 5 is a schematic diagram of a travel motor according to the present disclosure.
Figure 6:
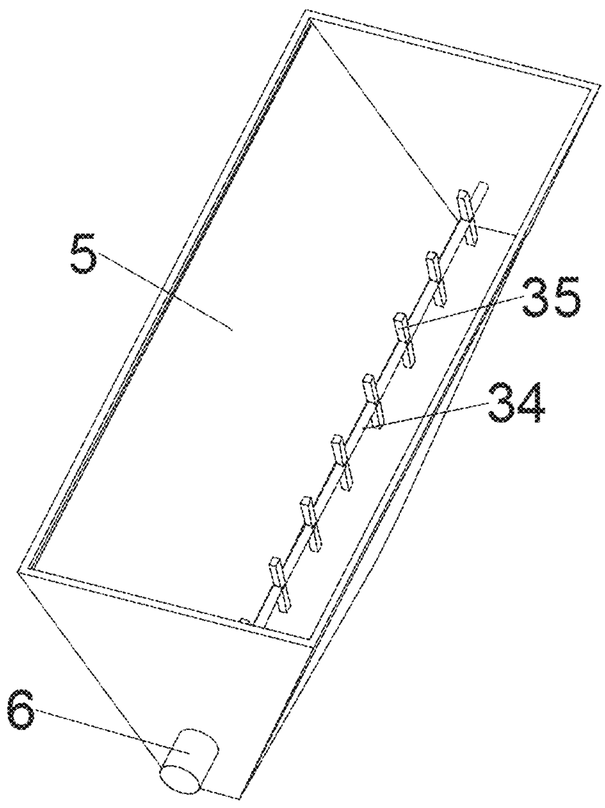
FIG. 6 is a schematic diagram of a storage tank according to the present disclosure.

As shown in FIG. 5, the travel motor 32 enables automatic movement of the vehicle body 1, improving the maneuverability of the device. At the same time, the rotating speed of the travel motor 32 may be controlled during the production process, so that the vehicle body 1 may advance at a certain speed, and production may be realized while traveling, which is more suitable for the construction requirements of the construction site.

In the description of the present disclosure, it should be understood that the terms “longitudinal”, “transverse”, “up”, “down”, “front”, “back”, “left”, “right”, “vertical”, “horizontal”, “top”, “bottom”, “inside”, “outside”, etc. indicate orientation or positional relationships based on the orientation or positional relationships shown in the accompanying drawings, only for the convenience of describing the present disclosure, and do not indicate or imply that the device or element referred to must have a specific orientation, be constructed and operated in a specific orientation, and therefore cannot be understood as a limitation of the present disclosure.

The above-mentioned embodiments only describe the preferred mode of the present disclosure, and do not limit the scope of the present disclosure. Under the premise of not departing from the design spirit of the present disclosure, various modifications and improvements made by one of ordinary skill in the art to the technical solution of the present disclosure should fall within the protection scope of the present disclosure.

What is claimed is:

1. A device for forming a concrete product, comprising:

a vehicle body;

a rotating disk, wherein the rotating disk is rotatably connected to the vehicle body, three placement grooves are evenly spaced along an edge of a top surface of the rotating disk, the placement grooves are used for placement of forming molds, and a rotation drive component is provided between the rotating disk and the vehicle body;

a platform, wherein the platform is fixedly connected to the vehicle body, the platform is located above the rotating disk, the platform is fixedly connected to a storage tank, and a bottom of the storage tank is in communication with one of the forming molds in the placement grooves via a pipeline component, the platform is further provided with a thermal pressure forming component, the thermal pressure forming component is used to heat and pressurize concrete in another of the forming molds, the platform is further provided with an ejection component, and the ejection component is used to push the forming molds after a pressurization process by the thermal pressure forming component out of the placement grooves; and a vibration assembly, wherein the vibration assembly comprises a concrete vibrator and a lifting mechanism arranged between the platform and the rotating disk, and the lifting mechanism is used to raise or lower the concrete vibrator;

wherein the concrete vibrator and the pipeline component are arranged in correspondence with the same one of the forming molds, the lifting mechanism is used to vibrate the concrete when the concrete is poured into the one of the forming molds, and to pull out the concrete vibrator from the one of the forming molds when the rotating disk drives the one of the forming molds to rotate;

wherein the lifting mechanism comprises a hinge base fixedly connected to a top of the platform, a middle part of a link is hinged on the hinge base, one end of the link is hinged to one end of a connecting rod, another end of the connecting rod penetrates the platform and is fixedly connected to the concrete vibrator, the rotating disk is coaxially and fixedly connected to a rotating rod, one end, away from the rotating disk, of the rotating rod penetrates the platform and is coaxially and fixedly connected to a pressing-down component, and the pressing-down component is used to lift another end, away from the connecting rod, of the link when the concrete is poured into the one of the forming molds, so as to enable the concrete vibrator to extend into the one of the forming molds, and to press down the other end, away from the connecting rod, of the link during rotation of the rotating disk, so as to pull out the concrete vibrator from the one of the forming molds; and wherein the pressing-down component comprises a pressing disk coaxially and fixedly connected to the end, away from the rotating disk, of the rotating rod, an edge of the pressing disk is provided with three intermediate grooves evenly spaced inwards, a bottom of the rotating disk is evenly and fixedly connected to three pressing-down blocks, the three intermediate grooves and the three pressing-down blocks are alternately arranged, the pressing-down blocks are used to press down the other end, away from the connecting rod, of the link, and the intermediate grooves are used for lifting of the other end, away from the connecting rod, of the link.

2. The device for forming the concrete product according to claim 1, wherein the ejection component comprises a fixed plate fixedly connected to a bottom of the platform, a cylinder is horizontally and fixedly connected to the fixed plate, a push block is fixedly connected to a telescopic end of the cylinder, the push block is used to push out the forming molds containing the pressurized concrete, locking components are provided between the rotating disk and the placement grooves, and the locking components are used to prevent the forming molds from shifting in the placement grooves and to automatically unlock the forming molds when the push block pushes out the forming molds.

3. The device for forming the concrete product according to claim 2, wherein each of the locking components comprises a sliding groove formed in the rotating disk, an intermediate rod is connected to and configured to vertically slide in the sliding groove, a spring is abutted between the intermediate rod and a bottom of the sliding groove, two ends of the intermediate rod are respectively and fixedly connected to a pressing block and a stopper, one end of the pressing block away from the intermediate rod penetrates a top of the rotating disk and is arranged in correspondence with the push block, and one end of the stopper away from the intermediate rod penetrates a bottom of a corresponding one the placement grooves and is arranged in correspondence with a side wall of a corresponding one of the forming molds entering an edge of the rotating disk.

4. The device for forming the concrete product according to claim 1, wherein the rotation drive component comprises a gear ring fixedly sleeved on the rotating disk and a second motor fixedly connected to the vehicle body, an output shaft of the second motor is fixedly sleeved with a gear, and the gear meshes with the gear ring.

5. The device for forming the concrete product according to claim 1, wherein the thermal pressure forming component comprises a hydraulic cylinder vertically and fixedly connected to a bottom of the platform, a pressing plate is fixedly connected to a telescopic end of the hydraulic cylinder, the pressing plate is used to press down the concrete in the forming molds containing the concrete, and an electric heating wire is provided in the pressing plate.

6. A method of a device for forming a concrete product, according to the device for forming the concrete product of claim 1, operation steps comprising:

moving the vehicle body to a construction site, and pouring the concrete into the storage tank;

starting the rotation drive component, driving the rotating disk to rotate by an angle through the rotation drive component, locating a first forming mold below a discharge port of the pipeline component, and pouring the concrete into the first forming mold through the pipeline component;

driving the rotating disk to rotate by another angle through the rotation drive component, locating a second forming mold below the discharge port of the pipeline component, locating the first forming mold below the thermal pressure forming component, starting the thermal pressure forming component to pressurize the concrete in the first forming mold, and opening the pipeline component to pour the concrete into the second forming mold;

driving the rotating disk to rotate by yet another angle sequentially through the rotation drive component, pouring the concrete into a third forming mold while pressurizing the second forming mold, and pushing the first forming mold out of a first placement groove through the ejection component; and placing an empty forming mold into the first placement groove again, and repeating the above steps for continuous production.

* * * * *